(12) United States Patent
Tamagawa et al.

(10) Patent No.: US 6,222,334 B1
(45) Date of Patent: Apr. 24, 2001

(54) REGENERATIVE BRAKING SYSTEM

(75) Inventors: Yutaka Tamagawa; Mitsuaki Hirakawa, both of Wako (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/395,980

(22) Filed: Sep. 15, 1999

(30) Foreign Application Priority Data

Sep. 16, 1998 (JP) .................................................. 10-261473

(51) Int. Cl.[7] ....................................................... H02P 3/14
(52) U.S. Cl. ............................................. 318/376; 180/65.3
(58) Field of Search ...................................... 318/139, 376, 318/377, 375; 180/65.2, 65.3, 65.4

(56) References Cited

U.S. PATENT DOCUMENTS

| | | | | |
|---|---|---|---|---|
| 3,947,740 | * | 3/1976 | Tsuboi | 318/376 |
| 4,908,553 | * | 3/1990 | Hoppie et al. | 318/282 |
| 5,686,807 | * | 11/1997 | Kusano et al. | 318/808 |
| 5,789,881 | * | 8/1998 | Egami et al. | 318/139 |
| 5,801,498 | * | 9/1998 | Kusano et al. | 318/139 |
| 5,808,428 | * | 9/1998 | Ito et al. | 318/139 |
| 5,839,800 | * | 11/1998 | Koga et al. | 303/152 |
| 5,898,282 | * | 4/1999 | Drozdz et al. | 318/139 |
| 6,013,992 | * | 1/2000 | Ishikawa et al. | 318/376 |
| 6,034,492 | * | 3/2000 | Saito et al. | 318/141 |

FOREIGN PATENT DOCUMENTS 7-123509   5/1995  (JP) .

\* cited by examiner

*Primary Examiner*—Jeffrey Donels
*Assistant Examiner*—Rina I. Duda
(74) *Attorney, Agent, or Firm*—Arent Fox Kintner Plotkin & Kahn, PLLC (57) ABSTRACT

A regenerative braking system for generating a regenerative torque depending on a predetermined torque command in an electric motor has a current detector, a voltage detector, a rotational speed detector, a target generated power calculating unit for calculating a target generated power from the voltage of a power supply of the electric motor, the rotational speed of the electric motor, and a predetermined torque command, an actual generated power calculating unit for calculating an actual generated power of the electric motor from the armature current of the electric motor and the voltage of the power supply of the electric motor, a manipulative quantity calculating unit for calculating a manipulative quantity to eliminate the difference between the target generated power and the actual generated power from the difference according to a feedback control process, and a regenerative control unit for controlling the armature current of the electric motor depending on the manipulative quantity upon regenerative braking.

8 Claims, 7 Drawing Sheets

REGENERATIVE BRAKING SYSTEM

BACKGROUND OF THE INVENTION

1. Field of the Invention

The present invention relates to a regenerative braking system for controlling a current flowing through the armature of an electric motor thereby to control a regenerative torque generated in the electric motor upon regenerative braking of a hybrid vehicle.

2. Description of the Related Art

Hybrid vehicles have an internal combustion engine and an electric motor for assisting in the output drive power of the internal combustion engine as propulsive power units for the vehicles. When such a hybrid vehicle is accelerated, the drive power of the internal combustion engine and also the drive power of the electric motor are applied to the drive wheels of the hybrid vehicle. In this manner, the output drive power of the internal combustion engine is reduced, the consumption of the fuel by the engine is lowered, and the exhaust performance of the engine is increased while at the same time the vehicle achieves a necessary acceleration capability.

The electric motor also operates as an electric generator. When the hybrid vehicle is decelerated, the kinetic energy of the vehicle is imparted from the drive wheels to the electric motor, which then operates as the electric generator. When the electric generator generates electric energy, it produces a regenerative torque which is applied to brake the vehicle (regenerative braking). The generated electric energy is retrieved to charge a power supply of the electric motor, e.g., a battery, an electric double-layer capacitor, or the like for effective energy utilization.

The regenerative torque generated in the electric motor is generally controlled by detecting a current flowing through the armature of the electric motor (hereinafter referred to as an "armature current"), and controlling the armature current in a feedback control loop so that the detected armature current will be equalized to a target current according to a given torque command. Specifically, a PWM (Pulse Width Modulation) control process is carried out to vary the pulse duration of a generated voltage outputted from the armature depending on the difference between the detected armature current and the target current for thereby regulating the armature current. With the armature current thus regulated to control the regenerative torque generated in the electric motor, if variations of the power supply voltage are relatively small as when a battery is used as the power supply of the electric motor, then since the ability of the actual current to follow the target current is constant, the regenerative torque generated in the electric motor can well be controlled. However, when a power supply whose output voltage is largely variable, such as an electric double-layer capacitor, is used as the power supply of the electric motor, the controllability of the regenerative torque generated in the electric motor is reduced as the ability of the armature current flowing from the armature to the power supply changes due to variations in the power supply voltage.

The above drawback may be eliminated by a software-implemented servo control process for inputting a detected power supply voltage, a detected armature current, a detected rotational speed of the electric motor, etc. as control parameters, and controlling the armature current depending on these control parameters.

In order to carry out the software-implemented servo control process, however, it is necessary to hold a large amount of data in advance for determining manipulative quantities to control an armature current from the values of the various control parameters, and also to perform complicated calculations for determining the manipulative quantities based on the large amount of data thus held. The complicated calculations need to be carried out at high speed so as not to cause a delay in the control of the electric motor. Consequently, the software-implemented servo control process requires, for its execution, a high-performance CPU and DSP capable of high-speed complex calculations. As a result, the system for effecting the regenerative braking is complex in structure and high in cost.

SUMMARY OF THE INVENTION

According to the present invention, there is provided a regenerative braking system for recovering electric energy generated by regenerative operation of an electric motor to charge a power supply of the electric motor for effecting regenerative braking to generate a regenerative torque depending on a predetermined torque command in the electric motor, comprising current detecting means for detecting an armature current flowing through an armature of the electric motor, a voltage detecting means for detecting a voltage of the power supply of the electric motor, rotational speed detecting means for detecting a rotational speed of the electric motor, target generated power calculating means for calculating a target generated power to be outputted from the armature to the power supply, from the voltage of the power supply detected by the voltage detecting means, the rotational speed of the electric motor detected by the rotational speed detecting means, and the torque command, actual generated power calculating means for calculating an actual generated power actually outputted from the armature, from the armature current of the electric motor detected by the current detecting means and the voltage of the power supply detected by the voltage detecting means, manipulative quantity calculating means for calculating a manipulative quantity to eliminate a difference between the target generated power and the actual generated power, from the difference, and regenerative control means for controlling the armature current of the electric motor depending on the manipulative quantity upon regenerative braking.

The regenerative control means controls the armature current of the electric motor depending on the manipulative quantity calculated by the manipulative quantity calculating means to eliminate the difference between the target generated power and the actual generated power. Stated otherwise, the regenerative control means controls the armature current of the electric motor in order to eliminate the difference between the target generated power and the actual generated power for thereby causing the regenerative torque generated in the electric motor to follow the torque command. Thus, even when the voltage of the power supply suffers large variations, the regenerative control means controls the armature current of the electric motor to suppress the effect of variations of the voltage of the power supply, so that the regenerative torque generated in the electric motor can follow the torque command with high accuracy.

If the voltage of the power supply of the electric motor increases by retrieving the electric energy generated by the electric motor, then since the difference between the voltage of the electric motor and the voltage of the power supply is reduced, the armature current flowing from the electric motor to the power supply is reduced. When the armature current is reduced, the regenerative torque generated in the electric motor may become smaller than the torque command. In such a case, the actual generated power is reduced, resulting in an increase in the difference between the target generated power and the actual generated power, so that the manipulative quantity calculated by the manipulative quantity calculating means increases. The regenerative control means increases the armature current of the electric motor depending on the manipulative quantity, i.e., to increase the actual generated power to eliminate the difference between the actual generated power and the target generated power. Therefore, even if the voltage of the power supply increases, the armature current of the electric motor is prevented from being reduced, allowing the regenerative torque generated in the electric motor to follow the torque command.

Because the manipulative quantity can be calculated by a simple calculating process, e.g., a PI (proportional plus integral) process, it is not necessary to employ a high-performance CPU and DSP. A controller for the electric motor can therefore comprise a CPU having a relatively low calculating capability, and hence is prevented from being complicated in arrangement and high in cost.

The regenerative control means may comprise means for handling the electric motor as converted to an equivalent circuit having a first armature on a q-axis in the direction of the flux of a field system of the electric motor and a second armature on a d-axis perpendicular to the q-axis, controlling an iq current flowing through the first armature and an id flowing through the second armature thereby to control the armature current of the electric motor, comparing the manipulative quantity calculated by the manipulative quantity calculating means with a predetermined reference manipulative quantity, and selectively performing a first regenerative control process for controlling the id current to increase the regenerative torque generated in the electric motor and a second regenerative control process for controlling the iq current to reduce the regenerative torque generated in the electric motor, depending on the result of comparison.

For example, a DC brushless motor generally has three-phase (u, v, w) armatures. If armature currents flowing through the three-phase armatures are directly controlled, then a process of controlling the armature currents is complex. In view of this, it is the general practice to control the three-phase electric motor in a dq coordinate system as converted to an equivalent circuit having a first armature on a q-axis in the direction of the flux of a field system of the electric motor and a second armature on a d-axis perpendicular to the q-axis, thus simplifying the process of controlling the armature currents.

For controlling the regenerative torque in the electric motor in the dq coordinate system, the first regenerative control process is basically carried out to control the id current to regulate the regenerative torque generated in the electric motor. If the regenerative torque generated in the electric motor is large even with the id current being nil, then the iq current is increased to produce the same effect as when the flux of the field system of the electric motor is reduced, thus performing the second regenerative control process for reducing the regenerative torque generated in the electric motor.

In controlling the regenerative torque generated in the electric motor according to the two control processes, i.e., the first regenerative control process and the second regenerative control process, using two parameters, i.e., the id current and the iq current, according to the present invention, the first regenerative control process and the second regenerative control process can selectively be carried out using one parameter representing the result of comparison between the reference manipulative quantity and the manipulative quantity. Consequently, a continuous change-over can be made between the first regenerative control process and the second regenerative control process for smoothly controlling the regenerative torque.

The regenerative control means may comprise dq current command determining means for determining an iq current command to be of a first fixed value and an id current command according to the manipulative quantity in the first regenerative control process, and determining an id current command, which is a control target for the id current, to be of a second fixed value and an iq current command, which is a control target for the iq current, according to the manipulative quantity in the second regenerative control process, armature current command calculating means for calculating an armature current command, which is a control target for the armature current of the electric motor, from the id current command and the iq current command determined by the dq current command determining means, and armature current control means for controlling the armature current of the electric motor so as to equalize the armature current of the electric motor detected by the current detecting means to the armature current command detected by the armature current command calculating means.

The dq current command determining means determines the iq current command to be of a first fixed value and the id current command according to the manipulative quantity in the first regenerative control process, and determines the id current command to be of a second fixed value and an iq current command according to the manipulative quantity in the second regenerative control process. The armature current command calculating means calculates the armature current command, which is the control target for the armature current of the electric motor, from the id current command and the iq current command determined by the dq current command determining means. Therefore, the id current is controlled in the first regenerative control process, and the iq current is controlled in the second regenerative control process.

The armature current command is determined so as to eliminate the difference between the target generated power and the actual generated power depending on the manipulative quantity. The armature current control means controls the armature current of the electric motor so as to equalize the armature current of the electric motor detected by the current detecting means to the armature current command. Therefore, even when the voltage of the power supply varies, the armature current of the electric motor is controlled to reduce the variations in the voltage of the power supply, allowing a regenerative torque depending on the torque command to be generated in the electric motor.

The regenerative control means may comprise retarded current command generating means for generating a retarded current command by retarding the armature current command calculated by the armature current command calculating means, the armature current command calculating means comprising means for controlling the armature current of the electric motor so as to equalize the armature current of the electric motor detected by the current detecting means to the retarded current command generated by the retarded current command generating means in the second regenerative control process.

When the regenerative torque in the electric motor is controlled in the dq coordinate system, the armature current command is of a sine wave and its phase is determined on the basis of a detected output of a position sensor for detecting the position of the field system of the electric motor. In the second regenerative control process, therefore, the phase of the armature current command is determined to generate a flux in a direction to weaken the flux of the field system, with respect to the detected position of the field system. However, since the sine wave has a low effective value, a current required to be generated in the armature in order to achieve an armature current depending on the armature current command has a large peak value. As a result, the armature current has a large peak value, and, as a result, the copper loss of the electric motor increases, reducing the efficiency of the electric motor as represented by (the generated power of the electric motor/the energy supplied to the electric motor).

According to the present invention, the phase of the armature current command can intentionally be shifted with respect to the detected position of the field system of the electric motor by retarding the armature current command with the retarded current command generating means. When the phase of the armature current command is shifted from the actual position of the field system, the difference between the armature current detected by the current detecting means and the armature current command increases. As a consequence, the armature current control means increases the armature current to eliminate the above difference. Since the armature current is limited by the voltage generated by the armature, the voltage of the power supply, and the arrangement of a regenerative circuit, the armature current cannot be increased infinitely, and the current flowing through the armature is limited in amplitude and becomes a rectangular wave, rather than a sine wave.

With the current through the armature being of a rectangular waveform, it has a high effective value, and the peak value of the armature current decreases. Thus, the copper loss of the electric motor is reduced, improving the efficiency of the electric motor. Because the current flowing through the armature is of a rectangular waveform based on the control characteristics of the armature current control means, it is not necessary to newly provide a dedicated circuit for generating a rectangular wave.

The retarded current command generating means may comprise means for changing the id current command determined by the dq current command determining means, depending on the torque command and the rotational speed of the electric motor detected by the rotational speed detecting means, changing the iq current command depending on the changed id current command and the iq current command determined by the dq current command determining means, and supplying the changed id current command and the changed iq current command to the armature current command calculating means thereby to retard the armature current command calculated by the armature current command calculating means for generating the retarded current command.

The id current command lags the iq current command by 90 degrees. Therefore, when the id current command is changed from the first fixed value (normally nil), the armature current command calculated by the armature current command calculating means can be retarded. The angle by which the armature current command is retarded, i.e., the lagging angle, is determined depending on the ratio of the id current command to the iq current command, and the amplitude of the armature current command is determined depending on the magnitudes of the id current command to the iq current command. Consequently, when the iq current command is changed together with the id current command, the armature current command can be retarded while its amplitude is kept constant.

Since the induced electromotive force of the electric motor varies depending on the rotational speed of the electric motor, the retarded current command generating means changes the id current command depending on the torque command and the rotational speed of the electric motor detected by the rotational speed detecting means, and changes the iq current command depending on the changed id current command and the iq current command. Thus, the lagging angle of the armature current command can be determined depending on the change in the rotational speed of the electric motor. As the lagging angle of the armature current command becomes greater, the difference between the armature current command and the armature current detected by the current detecting means. Therefore, the pulse duration of the rectangular wave applied to the armature of the electric motor controlled by the armature current control means is increased, increasing an effect of weakening the flux of the field system. By thus determining the lagging angle of the armature current command depending on the rotational speed of the electric motor, the regenerative torque actually generated in the electric motor is prevented from varying due to variations in the efficiency of the electric motor, for thereby controlling the regenerative torque highly accurately.

The retarded current command generating means may comprise means for determining a lagging angle by which the armature current command is to be retarded, depending on the voltage of the power supply detected by the voltage detecting means and the rotational speed of the electric motor detected by the rotational speed detecting means, changing the id current command and the iq current command determined by the dq current command determining means, depending on the lagging angle and the iq current command determined by the dq current command determining means, and supplying the changed id current command and the changed iq current command to the armature current command calculating means thereby to retard the armature current command calculated by the armature current command calculating means for generating the retarded current command.

The efficiency of the electric motor varies with the rotational speed of the electric motor and the voltage of the power supply of the electric motor. When the lagging angle is determined depending on the rotational speed of the electric motor and the voltage of the power supply, the regenerative torque actually generated in the electric motor is prevented from varying due to variations in the efficiency of the electric motor, for thereby controlling the regenerative torque highly accurately. As described above, the lagging angle of the armature current command is determined depending on the ratio of the id current command to the iq current command, and the amplitude of the armature current command is determined depending on the magnitudes of the id current command to the iq current command. Consequently, when the id current command and the iq current command are changed depending on the lagging angle and the iq current command, the armature current command can be retarded while its amplitude is kept constant.

If the electric motor comprises a DC brushless motor, then since the id current and the iq current can be treated as direct currents, the first regenerative control process and the second regenerative control process can be performed more easily.

If an electric double-layer capacitor whose output voltage is variable greatly is employed as the power supply of the electric motor, then the regenerative torque generated in the electric motor upon regenerative braking tends to vary. Therefore, it is particularly effective to control the armature current of the electric motor depending on the manipulative quantity with the regenerative control means for keeping the regenerative torque stably.

The above and other objects, features, and advantages of the present invention will become apparent from the following description when taken in conjunction with the accompanying drawings which illustrate preferred embodiments of the present invention by way of example.

DETAILED DESCRIPTION OF THE PREFERRED EMBODIMENTS

Figure 1:
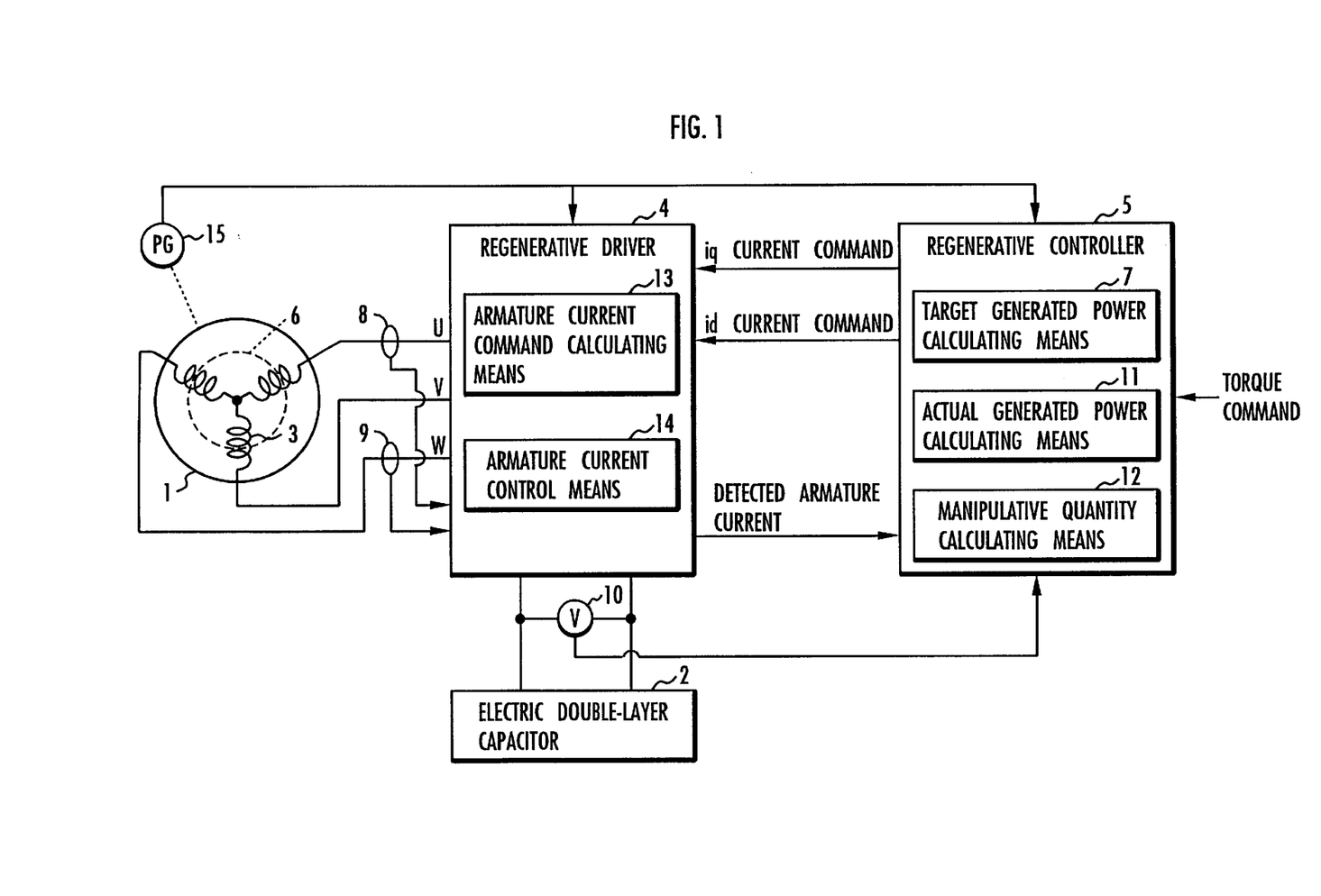
FIG. 1 is a block diagram of a regenerative braking system according to a first embodiment of the present invention.

As shown in FIG. 1, a regenerating braking system according to a first embodiment of the present invention is mounted on a hybrid vehicle which generates propulsive power with a combination of an internal combustion engine (not shown) and a DC brushless motor 1. When the hybrid vehicle is accelerated, the drive power of the internal combustion engine and the drive power of the motor 1 are imparted to the drive wheels of the vehicle. When the hybrid vehicle is decelerated, the kinetic energy of the vehicle is applied from the drive wheels to the motor 1 to cause the motor 1 to operate as an electric generator. When the motor 1 generates electric energy as the electric generator, it produces a regenerative torque to brake the vehicle (regenerative braking), and the generated electric energy is retrieved to charge a power supply 2 of the motor 1.

The DC brushless motor 1 comprises a three-phase armature 3 for generating a revolving magnetic field and a rotor 6 having a permanent magnet field system. The power supply 2 comprises an electric double-layer capacitor that can be charged by the electric energy generated by the motor 1 when it operates as the electric generator. A current flowing through the armature 3 of the motor 1, i.e., an armature current, is detected by current detecting means 8, 9. A voltage across the power supply 2 is detected by a voltage detecting means 10. An encoder 15 (corresponding to a rotational speed detecting means) outputs a pulse signal representing the rotational speed of the motor 1.

The regenerating braking system has a regenerative driver 4 for controlling the armature current flowing through the armature 3 of the motor 1 in order to cause the motor 1 to generate a desired regenerative torque when the hybrid vehicle is braked, and a regenerative controller 5 for supplying a command for controlling the regenerative torque to the regenerative driver 4. The regenerative driver 4 and the regenerative controller 5 jointly make up a regenerative control means.

The regenerative controller 5, which comprises a CPU, a ROM, a RAM, etc., is supplied with the speed of the hybrid vehicle, the output voltage of the power supply 2, etc., and indicates a control target value for the armature current to the regenerative driver 4 for causing the motor 1 to generate a regenerative torque depending on a torque command given by a general controller (not shown) which controls operation of the hybrid vehicle.

Figure 2:
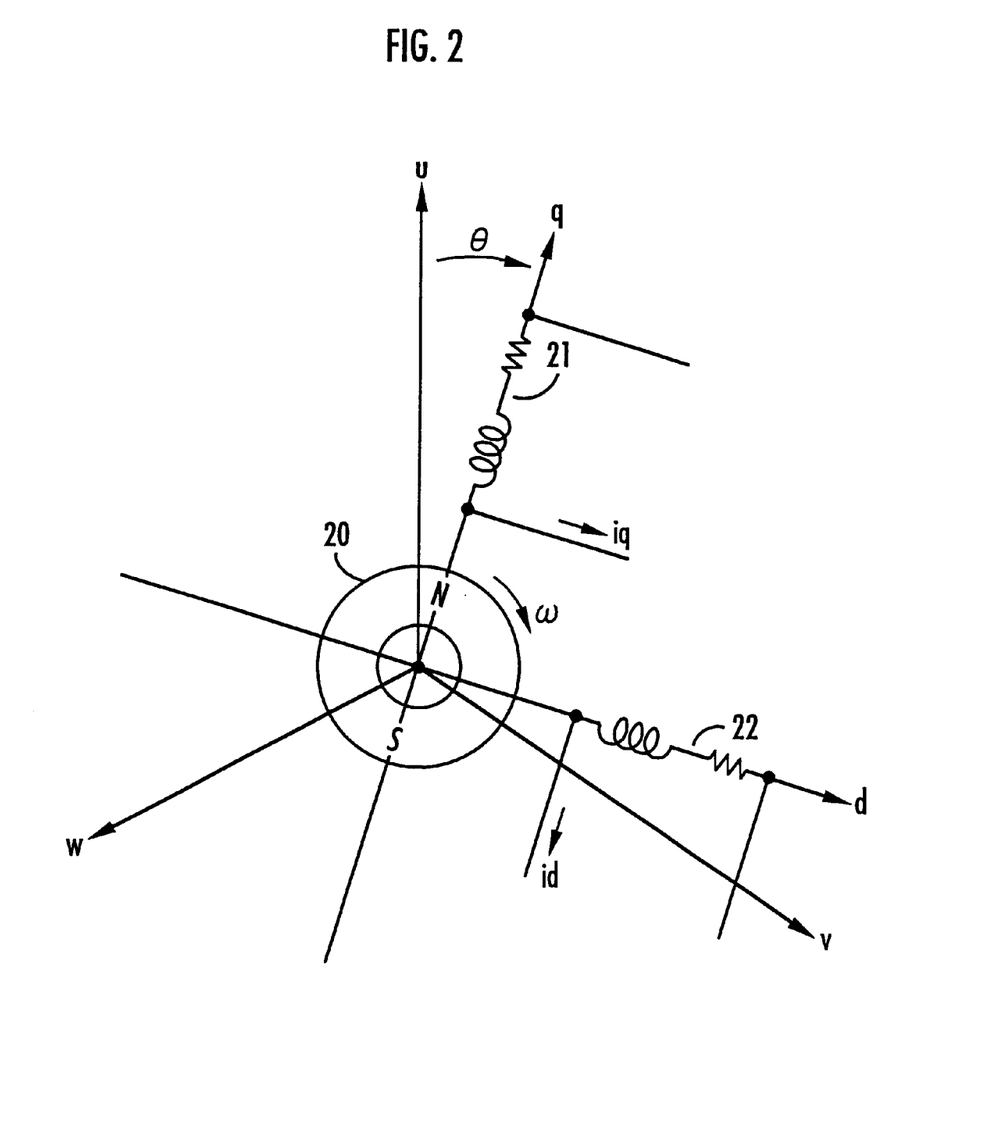
FIG. 2 is a diagram illustrative of a dq coordinate system.

As shown in FIG. 2, the regenerative controller 5 and the regenerative driver 4 handles the motor 1 which has a three-phase (u, v, w) armature as an equivalent circuit having a first armature 21 positioned on a q-axis in the direction of the flux of a permanent magnet field system 20 of the rotor 6, and a second armature 22 positioned on a d-axis that is perpendicular to the q-axis. In the equivalent circuit, when the field system 20 rotates with the q- and d-axes at an angular velocity $\omega$ under the drive power transmitted from the drive wheels upon regenerative braking of the hybrid vehicle, an electromotive force represented by $\omega \times \Phi$ ($\Phi$ indicates the number of flux linkages) is induced across the second armature 22 due to the changing direction of the flux of the field system 20.

An equation for controlling the regenerative torque Tr of the motor 1 in the dq coordinate system is expressed as follows:

$$Tr = p \times \Phi \times id \quad (1)$$

where p represents the number of pole pairs of the armatures, $\Phi$ the number of flux linkages, and id the current flowing through the second armature 22 on the d-axis (hereinafter referred to as an "id current").

It can be seen from the above equation (1) that if the flux of the field system 20 is constant, then the regenerative torque generated in the motor 1 can be controlled by controlling the id current. The current flowing through the first armature 21 on the q-axis (hereinafter referred to as an "iq current") is normally controlled so as to be nil. When the iq current flows, a flux whose direction is opposite to the direction of the flux of the field system 20 is generated by the first armature 21 on the q-axis, resulting in the same effect as when the flux of the field system 20 is reduced. When the flux of the field system 20 is reduced, since the number of flux linkages is reduced, the regenerative torque generated in the motor 1 can be reduced.

In the DC brushless motor 1, the id current and the iq current can be treated as direct currents. An equation for conversion between the id and iq currents and actual currents flowing through the three-phase (u, v, w) armature 3 is given as follows:

$$\begin{pmatrix} iu \\ iv \\ iw \end{pmatrix} = \sqrt{\frac{2}{3}} \begin{pmatrix} \cos\theta & \sin\theta \\ \cos\left(\theta - \frac{2\pi}{3}\right) & \sin\left(\theta - \frac{2\pi}{3}\right) \\ \cos\left(\theta + \frac{2\pi}{3}\right) & \sin\left(\theta + \frac{2\pi}{3}\right) \end{pmatrix} \begin{pmatrix} iq \\ id \end{pmatrix} \quad (2)$$

where iu, iv, iw indicate currents flowing respectively through the u, v, w phases of the armature 3, id the id current, iq the iq current, and $\theta$ the gradient of the q-axis (see FIG. 2) with respect to the u-axis detected from the output of the encoder 15.

Based on the control process in the dq coordinate system as described above, the regenerative controller 5 has a target generated power calculating means 7 for calculating a target generated power which is a control target for the electric power to be generated by the motor 1, depending on a torque command, a rotational speed of the motor 1 detected by the encoder 15, and a voltage of the power supply 2 detected by the voltage detecting means 10, an actual generated power calculating means 11 for calculating an electric power (hereinafter referred to as an "actual electric power") outputted from the motor 1 to the power supply 2 from a detected armature current (hereinafter referred to as an "actual armature current") from the current detecting means 8, 9 and a detected voltage of the power supply 2 from the voltage detecting means 10, and a manipulative quantity calculating means 12 for calculating a manipulative quantity to eliminate any difference between the target generated power and the actual electric power. The regenerative controller 5 determines an id current command and an iq current command, which correspond to a control target for the armature current, from the manipulative quantity calculated by the manipulative quantity calculating means 12, and supplies the id current command and the iq current command to the regenerative driver 4.

The regenerative driver 4 has an armature current command calculating means 13 for calculating an armature current command which is a control target for the armature current to be actually supplied to the armature 3 from the id current command and the iq current command that are supplied from the regenerative controller 5, according to the above equation (2), and an armature current control means 14 for controlling the armature current by regulating the pulse duration of an AC voltage outputted from the armature 3 of the motor 1 under PWM control in order to equalize the actual armature current detected by the current detecting means 8, 9 to the armature current command.

Figure 3:
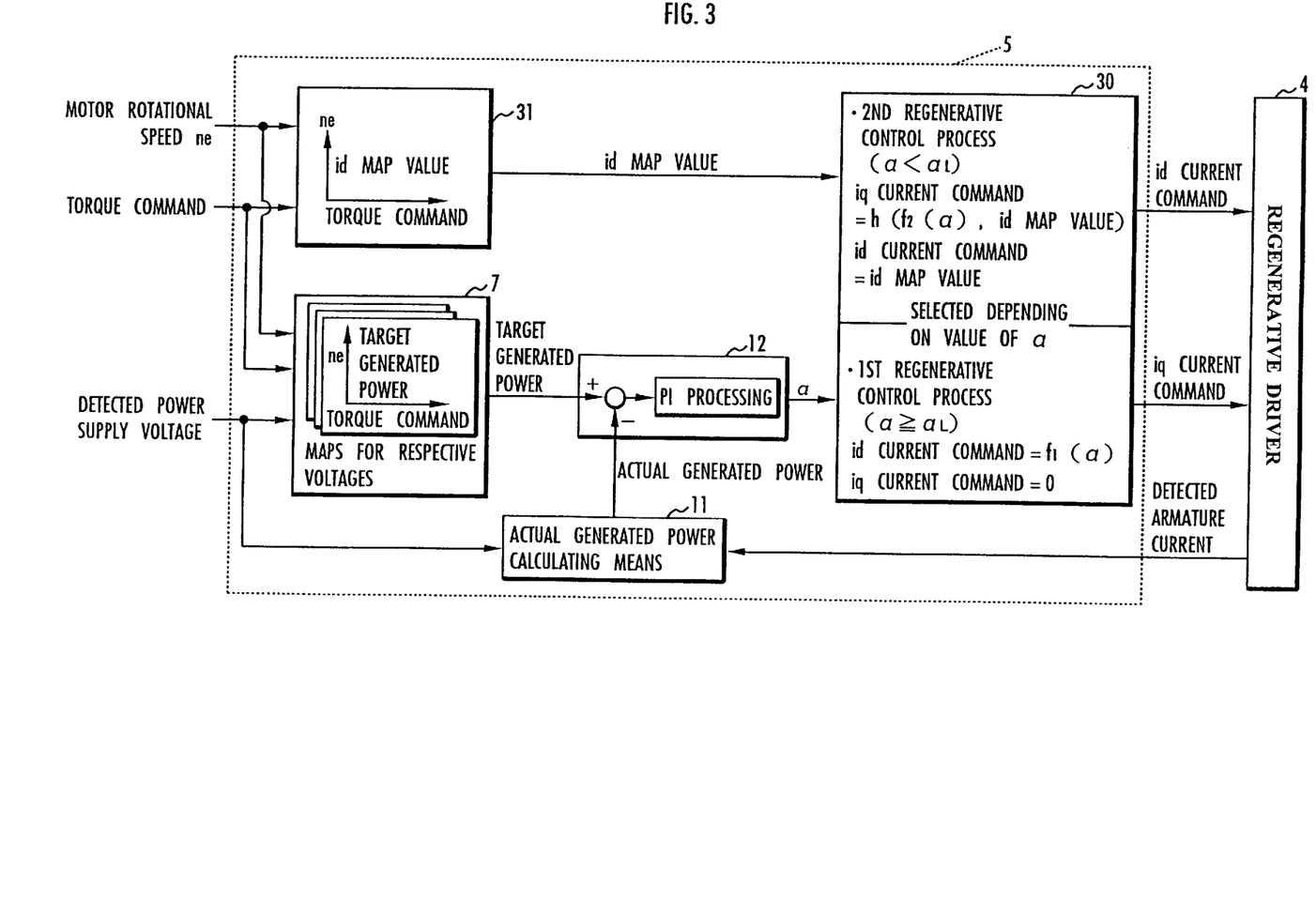
FIG. 3 is a block diagram of a regenerative controller in the regenerating braking system shown in FIG. 1.

As shown in FIG. 3, the target generated power calculating means 7 of the regenerative controller 5 has a plurality of maps, associated with respective voltage intervals of the power supply 2, for determining a target generated power depending on the rotational speed of the motor 1 detected by the encoder 15 and the torque command. The target generated power calculating means 7 selects one of the maps depending on the voltage of the power supply 2 detected by the voltage detecting means 10, and determines a target generated power from the selected map.

The regenerative torque generated in the motor 1 is basically determined according to the magnitude of the id current as shown by the above equation (1). However, since the regenerative torque is affected by a mechanical loss that varies depending on the rotational speed of the motor 1 and an electrical loss caused by the regenerative driver 4 which varies depending on the voltage of the power supply 2, even if the id current command is constant, there may be instances where the regenerative torque actually transmitted from the motor 1 to the drive wheels is not constant.

As described above, the target generated power calculating means 7 determines a target generated power in order to achieve a regenerative torque according to the torque command, depending on the depending on the rotational speed of the motor 1 detected by the encoder 15 and the voltage of the power supply 2 detected by the voltage detecting means 10. The target generated power calculating means 7 can thus determine a target generated power in view of variations in the rotational speed of the motor 1 and variations in the voltage of the power supply 2.

The manipulative quantity calculating means 12 calculates a manipulative quantity α for eliminating a difference ΔPower between the target generated power calculated by the target generated power calculating means 7 and the actual generated power calculated by the actual generated power calculating means 11, in a PI (proportional plus integral) process under feedback control as indicated by the following equation:

$$\alpha = Kp \times \Delta Power + KI \times \int \Delta Power \qquad (3)$$

where KP, KI represent coefficients determined on the basis of the characteristics of the motor 1 and experimental results.

Because the manipulative quantity α is calculated by a relatively simple process, the CPU of the regenerative controller 5 is not required to have a high-level calculating capability, but may be of a relatively low calculating capability.

The regenerative controller 5 has a dq current command determining means 30 for determining an id current command and an iq current command which are to be supplied to the regenerative driver 4, based on the manipulative quantity α calculated by the manipulative quantity calculating means 12. The dq current command determining means 30 compares the manipulative quantity α ($\alpha_{min} \leq \alpha \leq \alpha_{max}$) with a reference manipulative quantity $\alpha_L$. If $\alpha_L \leq \alpha$, i.e., if the actual generated power is smaller than the target generated power, with the regenerative torque generated in the motor 1 being insufficient, then the dq current command determining means 30 performs a first regenerative control process for controlling the id current command to increase the regenerative torque generated in the motor 1. If $\alpha < \alpha_L$, i.e., if the actual generated power is greater than the target generated power, with the regenerative torque generated in the motor 1 being excessive, then the dq current command determining means 30 performs a second regenerative control process for controlling the iq current command to reduce the regenerative torque generated in the motor 1.

In this manner, the target generated power calculating means 7 calculates a target generated power to achieve a command torque depending the detected voltage of the power supply 2 and the rotational speed ne of the motor 1, and the dq current command determining means 30 supplies an id current command and an iq current command to the regenerative driver 4 in order to achieve the target generated power. Therefore, even when the voltage of the power supply 2 suffers large variations, the regenerative torque can be controlled with high accuracy.

The dq current command determining means 30 switches between the first regenerative control process and the second regenerative control process based on a single parameter which represents the result of comparison between the manipulative quantity α and the reference manipulative quantity $\alpha_L$. Consequently, a continuous change-over can be made between the first regenerative control process and the second regenerative control process for smoothly controlling the regenerative torque. In this embodiment, the reference manipulative quantity $\alpha_L$ is set to a point where both the id current command and the iq current command are nil.

In the first regenerative control process, the dq current command determining means 30 determines the id current command to be nil (corresponding to a predetermined value according to the present invention), and determines the iq current command from the manipulative quantity α according to a scaling function $f_1(\alpha)$. In the second regenerative control process, the dq current command determining means 30 determines the id current command from an id map 31 (see FIG. 3), and determines the iq current command from the manipulative quantity a according to a scaling function $f_2(\alpha)$.

Figure 4:
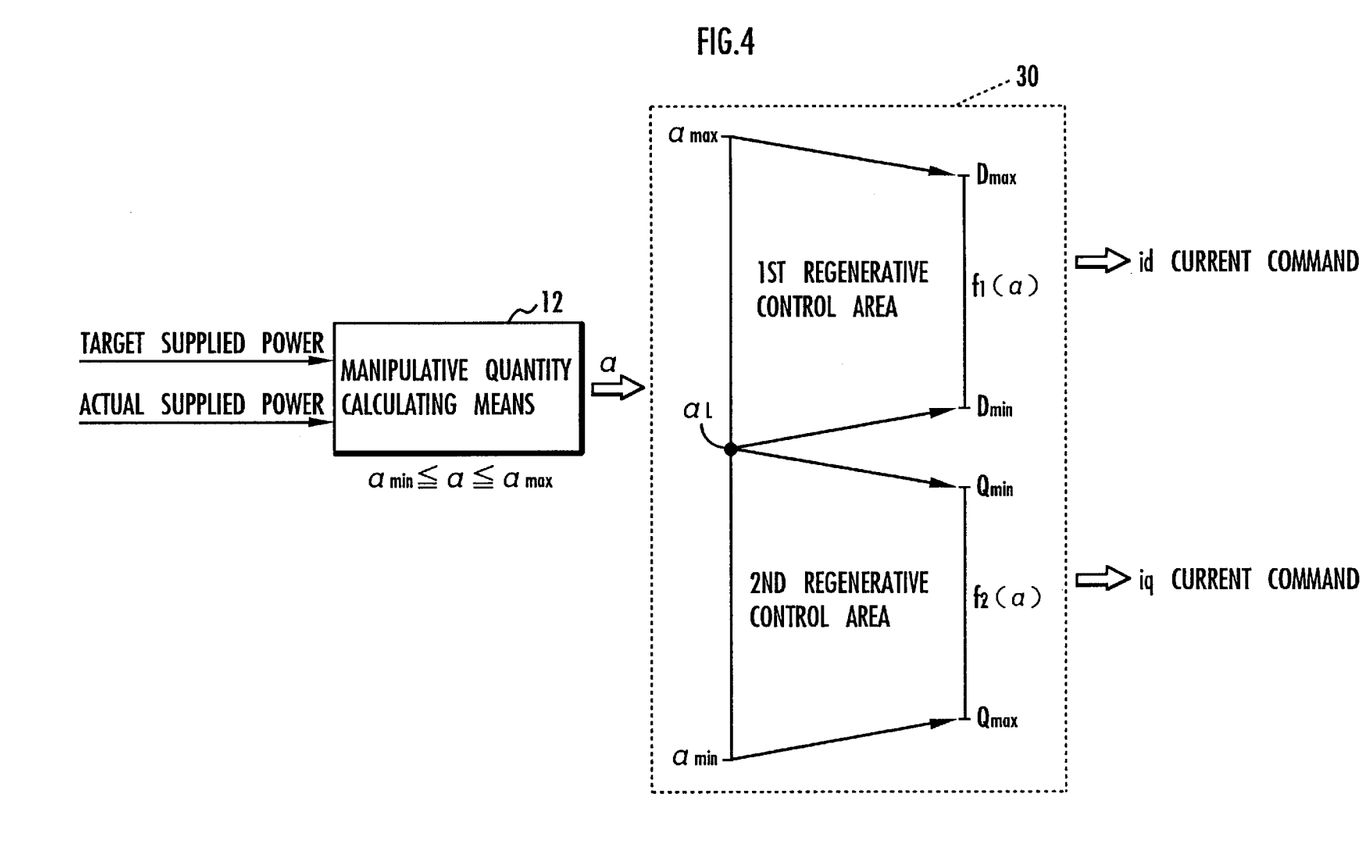
FIG. 4 is a block diagram of a dq current command determining means shown in FIG. 3.

FIG. 4 illustrates the scaling function $f_1(\alpha)$ and the scaling function $f_2(\alpha)$. In a first regenerative control area ($\alpha_L \leq \alpha \leq \alpha_{max}$), the id current command is determined based on the manipulative quantity α according to the scaling function $f_1(\alpha)$ (the id current command=$f_1(\alpha)$, $D_{min} \leq f_1(\alpha) \leq D_{max}$). According to the scaling function $f_1(\alpha)$, as the manipulative quantity α is greater (as the actual generated power is smaller than the target generated power), the id current command is greater. In a second regenerative control area ($\alpha_{min} \leq \alpha \leq \alpha_L$), the iq current command is determined based on the manipulative quantity α according to the scaling function $f_2(\alpha)$ (the iq current command=$f_2(\alpha)$, $Q_{min} \leq f_2(\alpha) \leq Q_{max}$). According to the scaling function $f_2(\alpha)$, as the manipulative quantity α is smaller (as the actual generated power is greater than the target generated power), the iq current command is greater.

In FIG. 3, the id map 31 serves to determine an id current command for retarding the armature current command calculated according to the equation (2) from the id current command and the iq current command, with the armature current command calculating means 13 (see FIG. 1) of the regenerative driver 4. In the second regenerative control process, basically, the id current command is determined to be nil (corresponding to a predetermined value according to the present invention), and the iq current command is determined according to the scaling function $f_2(\alpha)$. These current commands are supplied to the regenerative driver 4, and the target generated power calculating means 7 (see FIG. 1) of the regenerative driver 4 controls the armature current in order to generate a regenerative torque depending on the torque command in the motor 1.

The armature current command calculated by the armature current command calculating means 13 is of a sine wave based on the position θ of the field system 20 detected from the output signal of the encoder 15. Therefore, the armature current is controlled by the armature current control means 14 so that the current actually outputted from the armature of the motor 1 to the regenerative driver 4 will be of a sine wave. However, since the sine wave has a low effective value, the armature current has a large peak value, and, as a result, the copper loss of the motor 1 increases, reducing the efficiency of the motor 1 as represented by (the generated power of the motor 1/the energy supplied to the motor 1).

Figure 5:
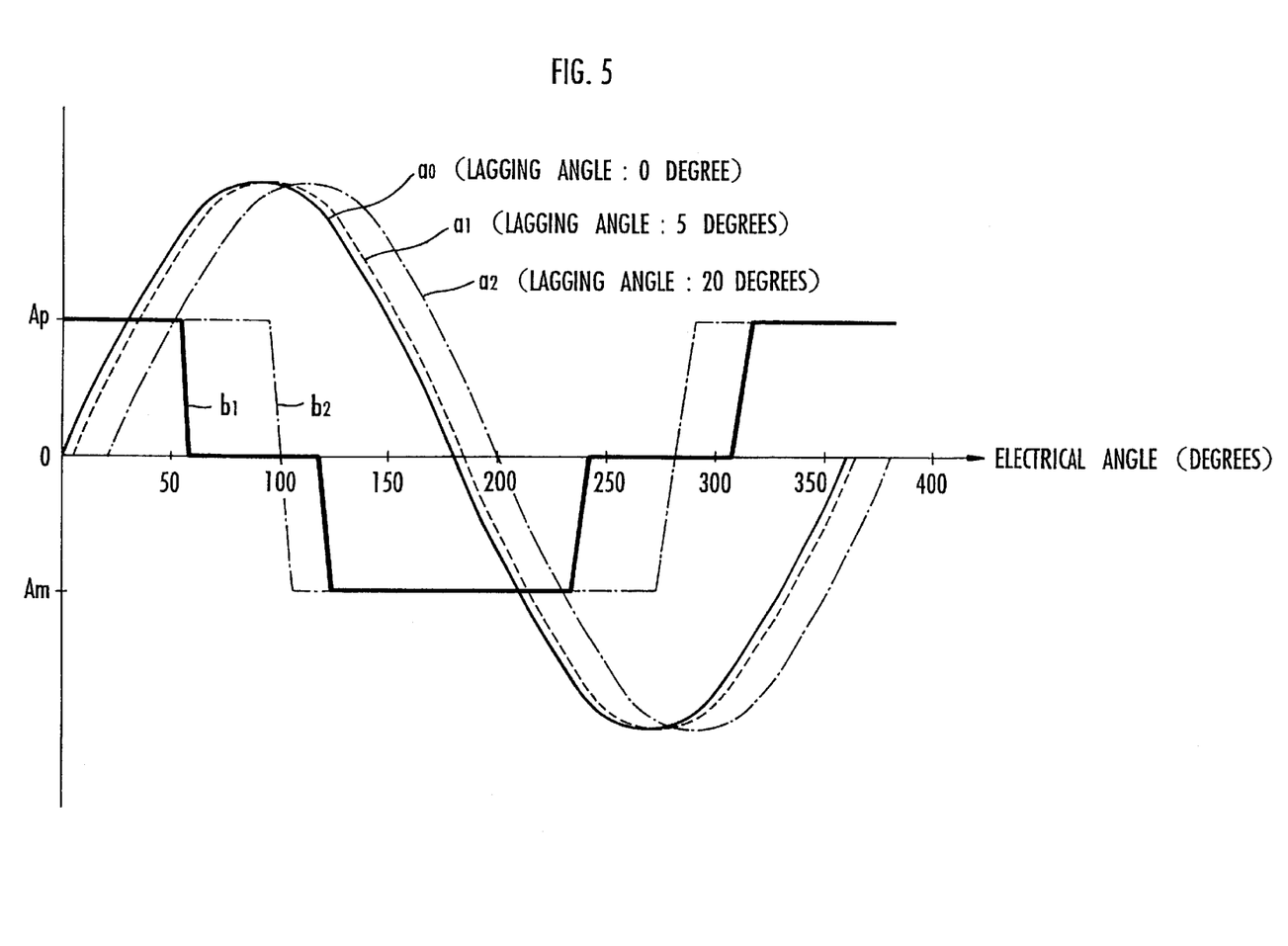
FIG. 5 is a diagram illustrative of a process of regarding an armature current command.

In order to prevent the efficiency of the motor 1 from being lowered, the dq current command determining means 30 performs a process of retarding the armature current command. FIG. 5 shows an effect produced when the armature current command is retarded. Specifically, FIG. 5 shows a waveform $a_0$ of the armature current command which is calculated by the armature current command calculating means 13 when the id current command is nil and the iq current command is determined according to the scaling function $f_2(\alpha)$, a waveform $a_1$ which lags the waveform $a_0$ by 5 degrees, and a waveform $a_2$ which lags the waveform $a_0$ by 20 degrees.

Inasmuch as the armature current command $a_0$ is calculated on the basis of the detected position of the field system 20, as described above, if the armature current command is intentionally retarded, then the difference between the actual armature current generated in the armature 3 and the armature current command increases. As a consequence, the target generated power calculating means 7 increases the armature current in order to eliminate the difference between the actual armature current and the armature current command.

As described above, the target generated power calculating means 7 increases the armature current under PWM control by controlling the pulse duration of an AC voltage outputted from the armature 3 of the motor 1 to the regenerative driver 4, depending on the difference between the actual armature current and the armature current command. When the difference between the actual armature current and the armature current command exceeds a predetermined level, the pulse duration of the AC voltage under PWM control is saturated, i.e., the duty cycle becomes 100%.

However, even when the pulse duration of the AC voltage is saturated, the armature current cannot be increased infinitely. There is a certain limitation on the armature current owing to the voltage produced by the motor 1, the voltage of the power supply 2, and the circuit arrangement of the regenerative driver 4. Accordingly, the waveform of a current flowing through the armature 3 is of a rectangular shape with a limited amplitude, as indicated by $b_1$ in FIG. 5. The rectangular waveform of the current flowing through the armature 3 has a high effective value, and reduces the peak value of the armature current. Therefore, the copper loss of the motor 1 decreases, and the efficiency of the motor 1 increases. As shown in FIG. 5, as the angle by which the armature current command is retarded (hereinafter referred to as a "lagging angle") increases, the pulse duration of the rectangular wave increases, resulting in an increased effect of weakening the flux of the field system 20.

The above equation (2) is modified into the following equation (4): That is, the armature current command can be retarded by adding the id current command to the iq command current.

$$iu = \sqrt{\frac{2}{3}} (iq\cos\theta + id\sin\theta) \qquad (4)$$
$$= \sqrt{\frac{2}{3}} \times \sqrt{iq^2 + id^2} \times \cos(\theta - \phi)$$
$$\therefore \phi = \tan^{-1}\left(\frac{id}{iq}\right) \qquad (5)$$

The amplitude of the retarded armature current command (hereinafter referred to as a "retarded current command") is determined by the magnitudes of the iq current command and the id current command according to the above equation (4). The lagging angle is determined by the ratio of the id current command to the iq current command according to the above equation (5).

The id map 31 determines an id map value for retarding the armature current command depending on the torque command and the rotational speed of the motor 1 detected by the encoder 15. The dq current command determining means 30 employs the id map value as an id current command and supplies the id current command, together with an iq current command (=h($f_2(\alpha)$, the id map value)) changed by a function h, to the regenerative driver 4. The function h serves to change the iq current command depending on the id map value so that the amplitude of the armature current command will remain unchanged after the retarding process.

The armature current command calculating means 13 calculates an armature current command from the id current command and the iq current command supplied from the dq current command determining means 30 according to the equation (4) thereby to generate a retarded current command. Since a retarded current command is generated on the basis of the id current command determined depending on the torque command and the rotational speed of the motor 1, the regenerative torque actually generated in the motor 1 is prevented from varying due to changes in the rotational speed of the motor 1, with the result that the regenerating torque can be controlled with high accuracy. Because the current flowing through the armature 3 is of a rectangular waveform based on the control characteristics of the armature current control means 14, it is not necessary to newly provide a dedicated circuit for generating a rectangular wave.

In the above first embodiment, the dq current command determining means 30, the id map 31, and the armature current command calculating means 13 jointly make up a retarded current command generating means.

A regenerative braking system according to a second embodiment of the present invention will be described below with reference to FIGS. 6 and 7. The regenerative braking system according to the second embodiment is basically the same as the regenerative braking system according to first embodiment, except for an arrangement for retarding an armature current command in a regenerative controller.

Figure 6:
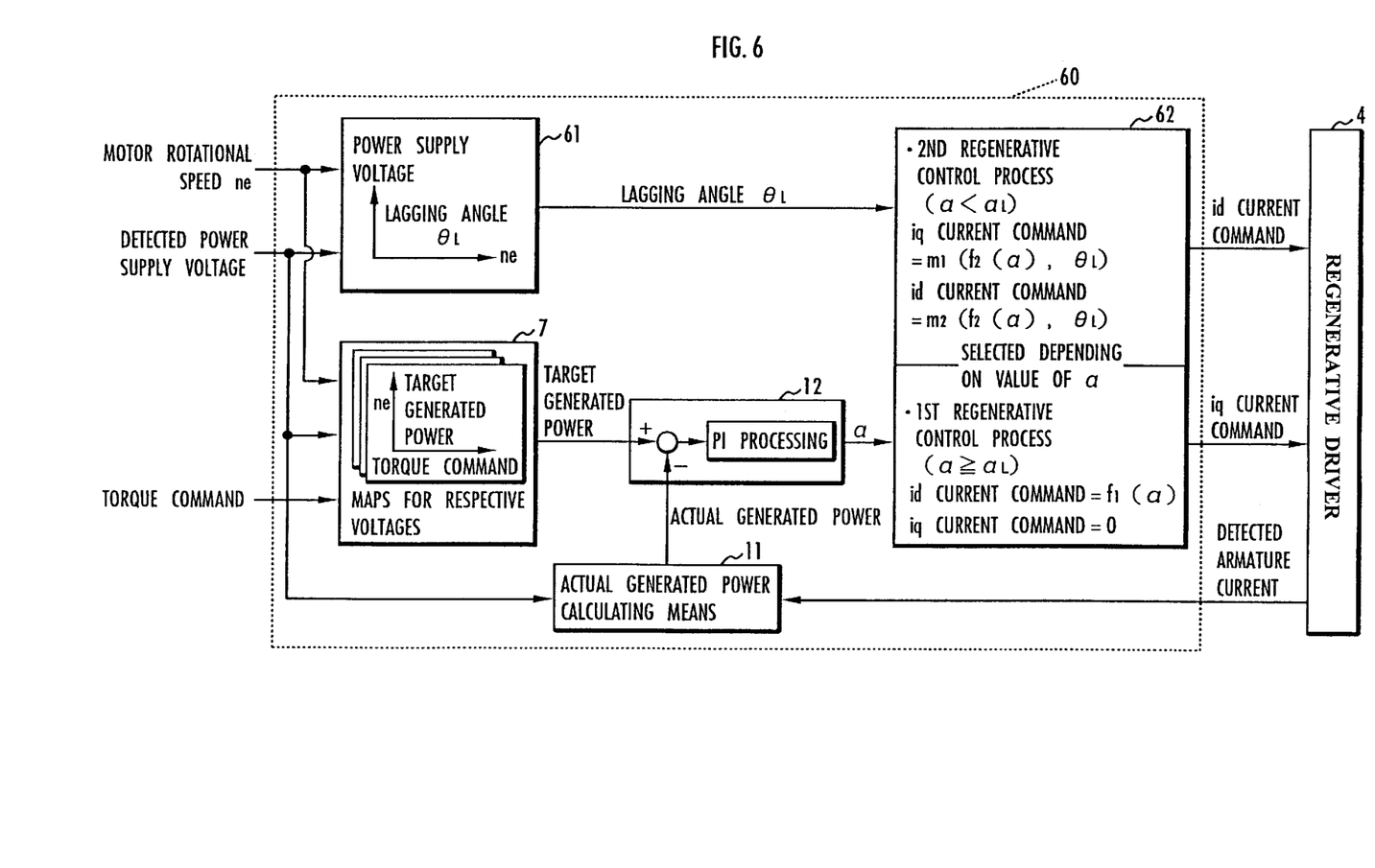
FIG. 6 is a block diagram of a regenerative controller according to a second embodiment of the present invention.
Figure 7:
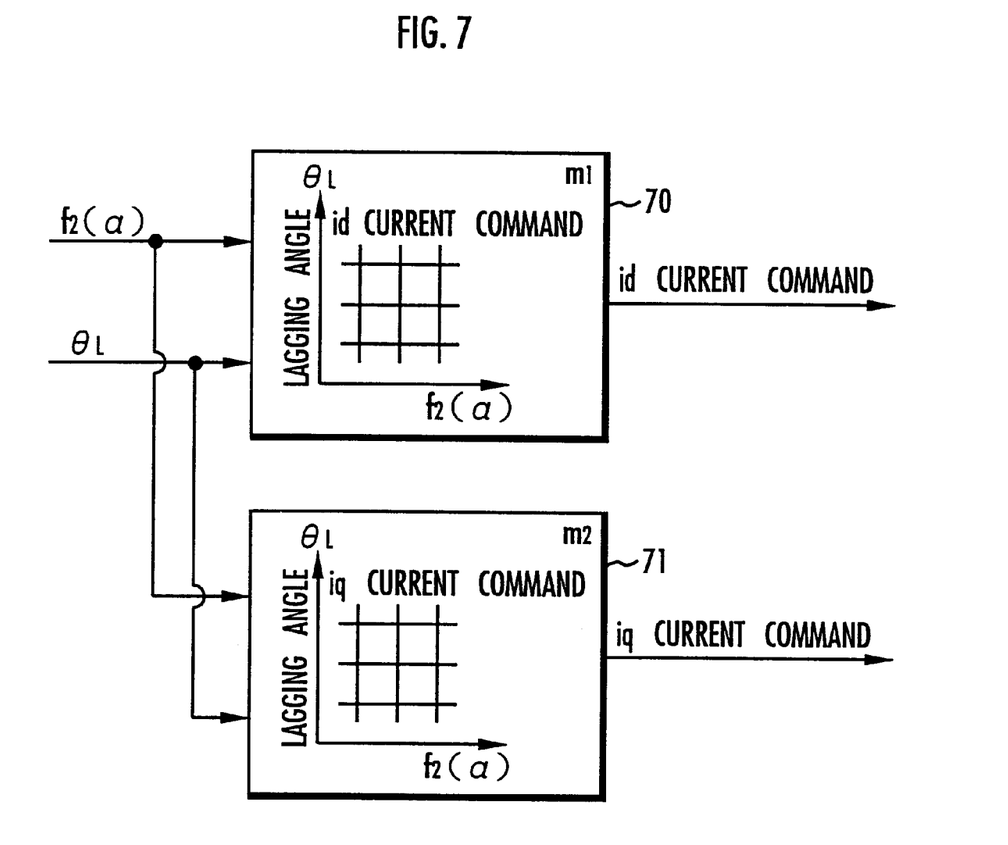
FIG. 7 is a block diagram of a dq current command determining means shown in FIG. 6.

As shown in FIG. 6, a regenerative controller 60 according to the second embodiment has a lagging angle map 61 for determining a lagging angle $\theta_L$ for the armature current command depending on a rotational speed ne of the motor 1 detected by the encoder 15 (see FIG. 1) and a voltage of the power supply 2 (see FIG. 1) detected by the voltage detecting means 10 (see FIG. 1). A dq current command determining means 62 according to the second embodiment determines an id current command and an iq current command to be supplied to the regenerative driver 4 so as to achieve the lagging angle $\theta_L$ determined from the lagging angle map 61. Those parts of the regenerative controller 60 which are identical to those of the regenerative controller 5 according to the first embodiment shown in FIG. 3 are denoted by identical reference characters, and will not be described in detail below.

The dq current command determining means 62 selectively performs the first regenerative control process and the second regenerative control process depending on the result of comparison between the manipulative quantity $\alpha$ calculated by the manipulative quantity calculating means 12 and the reference manipulative quantity $\alpha_L$, as with the first embodiment. In the first regenerative control process, the dq current command determining means 62 determines the iq current command to be nil (corresponding to a first fixed value according to the present invention) and determines the id current command according to the scaling function $f_1(\alpha)$, and supplies the iq current command and the id current command to the regenerative driver 4.

In the second regenerative control process, the dq current command determining means 62 determines the id current command to be nil (corresponding to a second fixed value according to the present invention). The lagging angle map 61 determines a lagging angle $\theta_L$ for the armature current command depending on the rotational speed ne of the motor 1 detected by the encoder 15 and a voltage of the power supply 2 detected by the voltage detecting means 10. The dq current command determining means 62 determines an iq current command depending on the manipulative quantity $\alpha$ calculated by the manipulative quantity calculating means 12 according to the scaling function $f_2(\alpha)$ Then, the dq current command determining means 62 changes the id current command, which has been determined to be nil, according to a function $m_1$ based on an id current command changing map 70 shown in FIG. 7, and also changes the iq current command, which has been determined according to the scaling function $f_2(\alpha)$, according to a function $m_2$ based on an iq current command changing map 71 shown in FIG. 7.

The functions $m_1$, $m_2$ change the id current command and the iq current command, respectively, depending on the lagging angle $\theta_L$ and the iq current command ($=f_2(\alpha)$) according to the scaling function $f_2(\alpha)$, so that the amplitude of the armature current command will remain unchanged after the retarding process. When the id current command and the iq current command are thus changed and supplied to the regenerative driver 4, the armature current command calculating means 13 calculates a retarded current command.

By thus determining a lagging angle for the armature current command depending on the rotational speed of the motor 1 and the voltage of the power supply 2, the regenerative torque actually generated in the motor 1 is prevented from varying due to changes in the efficiency of the motor 1 depending on changes in the rotational speed of the motor 1 and the voltage of the power supply 2. As a result, the regenerative torque can be controlled highly accurately.

In the first and second embodiments, the id current command is added to the iq current command to generate a retarded current command by retarding the armature current command. However, a delay circuit may be employed, and the armature current command calculated by the armature current command calculating means 13 may be outputted through the delay circuit to generate a retarded current command.

If the copper loss of the motor 1 does not pose a substantial problem, then the armature current command may not be retarded in the second regenerative control process, and the dq current command determining means may determine an id current command to be nil and determine an iq current command according to the scaling function $f_2(\alpha)$, and supply the id current command and the iq current command to the regenerative driver 4.

In the first and second embodiments, the motor 1 which has been converted to the equivalent circuit in the dq coordinate system shown in FIG. 2 is controlled. However, the three-phase alternating currents flowing through the armature 3 of the motor 1 may directly be controlled, or the motor 1 expressed as an equivalent circuit in a two-phase AC coordinate system converted from the three-phase AC coordinate system may be controlled.

While both the first fixed value in the first regenerative control process and the second fixed value in the second regenerative control process are determined to be nil, they may not be strictly nil, and may be determined to be values near nil.

In the illustrated embodiments, the DC brushless motor has been described. However, the principles of the present invention are applicable to other types of electric motors.

The electric double-layer capacitor whose output voltage is variable greatly is employed as the power supply of the motor to great advantage in the above embodiments. However, the advantages of the present invention can also be achieved if the present invention is applied to other types of power supply.

Although certain preferred embodiments of the present invention have been shown and described in detail, it should be understood that various changes and modifications may be made therein without departing from the scope of the appended claims.

What is claimed is:

1. A regenerative braking system for recovering electric energy generated by regenerative operation of an electric motor to charge a power supply of the electric motor for effecting regenerative braking to generate a regenerative torque depending on a predetermined torque command in the electric motor, comprising:

current detecting means for detecting an armature current flowing through an armature of the electric motor;

a voltage detecting means for detecting a voltage of the power supply of the electric motor;

rotational speed detecting means for detecting a rotational speed of the electric motor;

target generated power c alculating means for calculating a target generated power to be outputted from said armature to said power supply, from the voltage of the power supply detected by said voltage detecting means, the rotational speed of the electric motor detected by said rotational speed detecting means, and said torque command;

actual generated power calculating means for calculating an actual generated power actually outputted from said armature, from the armature current of the electric motor detected by said current detecting means and the voltag e of the power supply detected by said voltage detecting means;

manipulative quantity calculating means for calculating a manipulative quantity to eliminate a difference between said target generated power and said actual generated power, from said difference; and regenerative control means for controlling the armature current of the electric motor depending on said manipulative quantity upon regenerative braking.

2. A regenerative braking system according to claim 1, wherein said regenerative control means comprises:

means for handling said electric motor as converted to an equivalent circuit having a first armature on a q-axis in the direction of the flux of a field system of the electric motor and a second armature on a d-axis perpendicular to said q-axis, controlling an iq current flowing through said first armature and an id flowing through said second armature thereby to control the armature current of the electric motor, comparing said manipulative quantity calculated by said manipulative quantity calculating means with a predetermined reference manipulative quantity, and selectively performing a first regenerative control process for controlling the id current to increase the regenerative torque generated in said electric motor and a second regenerative control process for controlling the iq current to reduce the regenerative torque generated in said electric motor, depending on the result of comparison.

3. A regenerative braking system according to claim 2, wherein said regenerative control means comprises:

dq current command determining means for determining an iq current command to be of a first fixed value and an id current command according to said manipulative quantity in said first regenerative control process, and determining an id current command, which is a control target for the id current, to be of a second fixed value and an iq current command, which is a control target for the iq current, according to said manipulative quantity in said second regenerative control process;

armature current command calculating means for calculating an armature current command, which is a control target for the armature current of the electric motor, from the id current command and the iq current command determined by said dq current command determining means; and armature current control means for controlling the armature current of the electric motor so as to equalize the armature current of the electric motor detected by said current detecting means to the armature current command calculated by said armature current command calculating means.

4. A regenerative braking system according to claim 3, wherein said regenerative control means comprises retarded current command generating means for generating a retarded current command by retarding the armature current command calculated by said armature current command calculating means, said armature current command calculating means comprising means for controlling the armature current of the electric motor so as to equalize the armature current of the electric motor detected by said current detecting means to the retarded current command generated by said retarded current command generating means in said second regenerative control process.

5. A regenerative braking system according to claim 4, wherein said retarded current command generating means comprises:

means for changing the id current command determined by said dq current command determining means, depending on said torque command and the rotational speed of the electric motor detected by said rotational speed detecting means, changing the iq current command depending on the changed id current command and the iq current command determined by said dq current command determining means, and supplying the changed id current command and the changed iq current command to said armature current command calculating means thereby to retard the armature current command calculated by said armature current command calculating means for generating said retarded current command.

6. A regenerative braking system according to claim 4, wherein said retarded current command generating means comprises:

means for determining a lagging angle by which the armature current command is to be retarded, depending on the voltage of the power supply detected by said voltage detecting means and the rotational speed of the electric motor detected by said rotational speed detecting means, changing the id current command and the iq current command determined by said dq current command determining means, depending on said lagging angle and the iq current command determined by said dq current command determining means, and supplying the changed id current command and the changed iq current command to said armature current command calculating means thereby to retard the armature current command calculated by said armature current command calculating means for generating said retarded current command.

7. A regenerative braking system according to any one of claims 2 through 6, wherein said electric motor comprises a DC brushless motor.

8. A regenerative braking system according to any one of claims 1 through 6, wherein said power supply comprises an electric double-layer capacitor.

* * * * *